No. 871,904.　　　　　　　　　　　　　　　　　　PATENTED NOV. 26, 1907.
E. C. WRIGHT.
SHAFT OSCILLATOR.
APPLICATION FILED APR. 20, 1907.
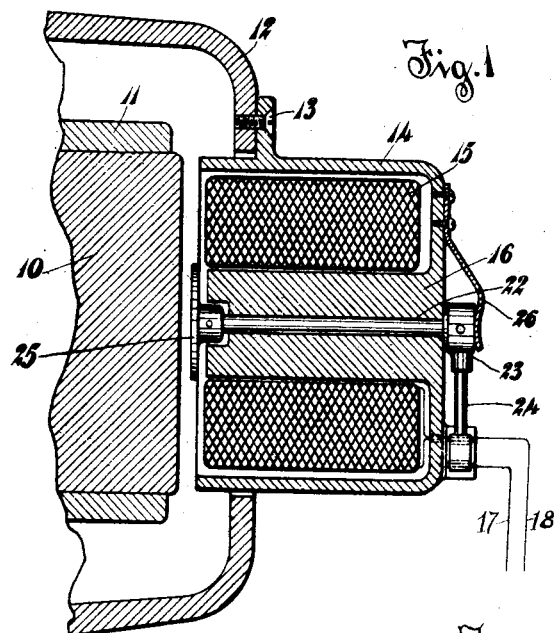
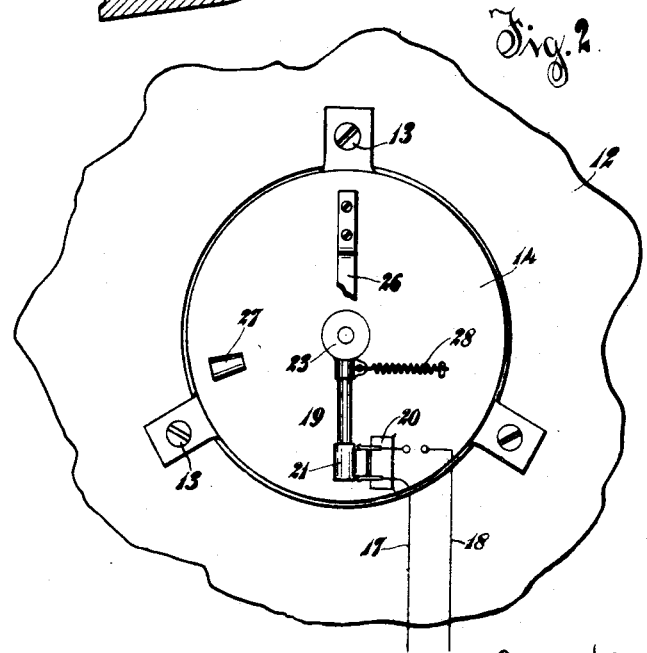
Witnesses
Inventor
Edwin C. Wright
By
Chas. E. Lord
Attorney

UNITED STATES PATENT OFFICE.

EDWIN C. WRIGHT, OF NEWPORT, KENTUCKY, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SHAFT-OSCILLATOR.

No. 871,904.　　　　Specification of Letters Patent.　　　　Patented Nov. 26, 1907.

Application filed April 20, 1907. Serial No. 369,219.

*To all whom it may concern:*

Be it known that I, EDWIN C. WRIGHT, a citizen of the United States, residing at Newport, in the county of Campbell and State of Kentucky, have invented certain new and useful Improvements in Shaft-Oscillators, of which the following is a full, clear, and exact specification.

My invention relates to shaft oscillators or end-play devices. It is particularly adapted for use in connection with dynamo-electric machines for the purpose of preventing grooving and roughening of the commutator.

My invention relates especially to the so-called magnetic shaft oscillators having a coil inductively related to the end of the shaft said coil being energized and deënergized by a make and break switch.

My invention has for its main object the provision of a magnetic shaft oscillator having a switch in the coil circuit which will be opened with a quick movement so that there will be a minimum of sparking at the switch contacts.

A further object is to provide a mechanism for operating the switch which will be simple in construction and operation.

In accordance with my invention I connect the movable member of the switch which controls the circuit of the magnetizing coil to a rotary member adapted to be engaged by the end of the shaft so as to be rotated thereby when the shaft reaches a certain point in its longitudinal movement.

In the preferred embodiment of my invention I provide a horizontal spindle or pin in line with the center of the shaft and connect to one end the movable member of the switch, and to the end adjacent the shaft a friction disk, the parts being so arranged that when the shaft has been moved a certain distance by the coil, it will engage the disk and impart to it and to the movable switch member a rapid rotary movement separating the switch contacts with an exceedingly quick break. As soon as the contacts are separated the circuit of the coil is broken. The shaft moves in the opposite direction under the normal bias of the machine and the movable switch member is returned by gravity or by a spring into engagement with the stationary switch member so as to again complete the circuit through the magnetizing coil.

In the drawings Figure 1 is a sectional elevation of my improved oscillator applied to the end of a shaft to be oscillated; and Fig. 2 is a partial end view of the same.

In the drawings, 10 represents the shaft to be oscillated, 11 the bearing sleeve and 12 the bearing housing. Secured to the housing by bolts or screws 13 is a casing or shell 14 of magnetic material which incloses the magnetizing coil 15 inductively related to the shaft and which on being energized and de-energized oscillates the shaft. The casing or shell has an integral lug or projection 16 in line with the center of the shaft and which serves as a core for the magnetizing coil. The coil is provided with terminals 17 and 18 and is adapted to be connected to and disconnected from a source of supply (not shown) by a rotary switch 19 having a stationary switch member 20, mounted in this case on the magnet shell or casing 14, and a movable switch member 21.

The means for intermittently operating the switch will now be described. The core 16 of the magnet is provided with a central longitudinal opening in which is rotatably mounted a spindle or pin 22 preferably of hardened material. The outer end of the spindle extends beyond the core 16 and carries the movable switch member 21, the latter being connected to the spindle by a collar 23 and arm 24 of insulating material.

Mounted on the opposite end of the spindle adjacent the end of the shaft is a friction disk 25 of some hard material having a hub located in a recess in the core or shaft, in this case the core, which disk is adapted to be engaged by the end of the shaft when the latter is attracted by the magnet and is near the limit of its longitudinal movement. The spindle preferably has a slight longitudinal play and is held yieldingly in its innermost position by a spring 26. The stationary switch member is so located that when the switch is closed the rotary switch member is in its lowermost position as shown in the drawings. On the casing 14 in the path of movement of the rotary switch member is a lug or projection 27 which limits the movement of said rotary switch member. I have in this case shown a spring 28 secured to the sleeve 23 and casing to assist in restoring the rotary switch member to its lowermost or closed position. If desired this spring can be dispensed with, in which case the switch will be closed by gravity.

When the switch is closed the coil is energized and attracts the shaft which is moved longitudinally in its bearings against the normal bias of the machine. When the shaft is near the limit of its movement the end of the shaft engages the friction disk rotating the latter, the spindle and the rotary member of the switch, the contacts of the switch thereby being quickly separated so that arcing is almost negligible. As soon as the contacts are separated the coil is deënergized and the shaft immediately moves in the opposite direction due to the attraction between the armature and field members. As soon as the disk and shaft separate and the movable switch member engages the lug, gravity or gravity assisted by the spring return the switch to its closed position, whereupon the same operation is repeated. When the shaft engages the disk, the disk and spindle move slightly endwise against the tension of the spring 26 so that the disk receives no sudden shock or blow.

I do not wish to be confined to the exact details shown but aim in my claims to cover all modifications which do not involve a departure from the spirit and scope of my invention.

What I claim as new is:—

1. In combination, a shaft, and a magnetic shaft oscillator comprising a coil at the end of the shaft, and a switch in circuit with said coil, said switch being controlled by the combined rotary and longitudinal movements of the shaft.

2. In combination, a shaft, a magnetic shaft oscillator comprising a coil at the end of the shaft, a switch in circuit with said coil, and rotary means disconnected from said shaft but adapted to be engaged by the end of the shaft to be rotated to open the switch.

3. In combination, a shaft, a magnetic shaft oscillator comprising a magnet coil at the end of the shaft, a switch in circuit with said coil, and a disk operatively connected to the movable member of the switch and adapted to be engaged by the end of the shaft when the latter reaches a certain position and to be rotated thereby.

4. In combination, a shaft, a magnetic shaft oscillator comprising a coil, a switch in circuit with said coil, and means for operating said switch, said means being connected to the movable switch member and yieldingly supported opposite the end of the shaft in position to be engaged by the shaft when the latter approaches the limit of oscillation in one direction so as to be rotated thereby.

5. In combination, a shaft, a magnetic shaft oscillator comprising a coil, a switch in circuit with said coil, and means for opening said switch with a quick break comprising a friction disk yieldingly and rotatably supported in line with the end of the shaft and connected to the movable member of the switch, so that when the shaft reaches a certain position in its longitudinal movement it will engage the disk and rotate the latter and the movable switch member to open the coil circuit.

6. In combination, a magnetic shaft oscillator comprising a coil inductively related to the end of the shaft, a spindle rotatably mounted opposite the end of the shaft, a friction disk secured to said spindle in position to be engaged by the shaft, and a switch in circuit with said coil having a rotary switch member operated by said spindle.

7. In combination, a shaft, a magnetic shaft oscillator comprising a coil inductively related to the end of the shaft, a spindle extending through the core of the coil, said spindle having at one end a friction disk adapted to be engaged and rotated by the shaft and at the other end a rotary member of a switch which controls the coil circuit.

In testimony whereof I affix my signature, in the presence of two witnesses.

EDWIN C. WRIGHT.

Witnesses:
 GEO. B. SCHLEY,
 FRED J. KINSEY.